Figure 1:
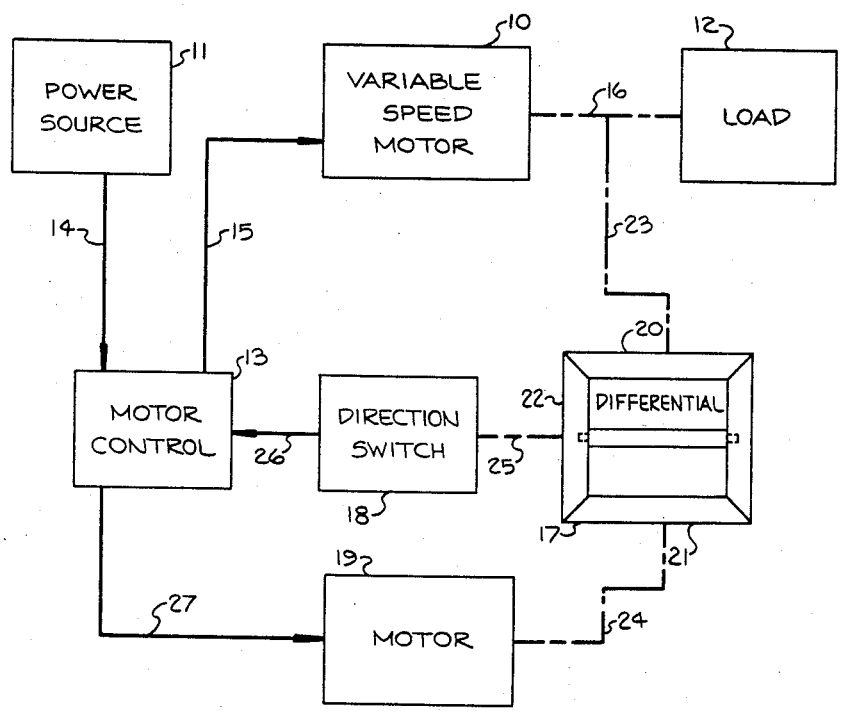

United States Patent Office 2,924,767
Patented Feb. 9, 1960

2,924,767

DIFFERENTIAL OPERATED OVERSPEED MOTOR CONTROL

Asa H. Myles, Solon, Ohio, assignor to Square D Company, Detroit, Mich., a corporation of Michigan Application June 18, 1958, Serial No. 742,867

1 Claim. (Cl. 318—323)

This invention is directed to a control mechanism for controlling the energization and de-energization of a motor, and more particularly for disconnecting a motor from its source of power or effectively de-energizing the motor when the speed of the motor reaches a certain predetermined speed. It is understod that the term disconnect is used herein in its electrical sense to include the opening of the contacts as well as the operating of other motor control devices, such as static switches, to terminate power transmission from a power source to the motor, thereby de-energizing the motor.

In the past, devices have been devised which disconnect at least one of two hoist motors from the power lines if respective parts of the hoist reach a predetermined positional relationship. An example of such device is illustrated in a patent, No. 2,328,697, issured to Paul White on September 7, 1943, for Limit Switch and Control System Combination, and assigned to the common assignee of the present application. It is particularly noted that the aforementioned patent is directed to the controlling of the motors in response to the relative position of certain parts of the hoisting apparatus, for example, to prevent jamming the crane hook in the boom, and not solely to the relative speeds of the motors.

In many installations of electric motors, either A.C. or D.C. it is desirable to have a motor connected to and energized by its source of power so long as the motor is running within a desired speed range extending between one speed and a predetermined certain speed. In these installations it is also desirable to de-energize the motor or to disconnect the motor from its source of power when the speed of the motor reaches that certain speed to prevent the motor continuing operation at a speed outside of the desired speed range.

The certain speed may be either at the lower speed end or at the higher speed end of the desired speed range, depending upon the particular application and use of the variable speed motor.

In the past, various devices and apparatus have been used in the control of and protection of motor and which effect a deenergization of the motor or a disconnection of the motor from its source of power when the speed of the motor reaches the neighborhood of, or approximates that certain speed at which it is desired to disconnect the motor. It is desirable to have these control devices very rugged, simple, and generally of mechanical construction such that they will withstand the environment to which they are subjected and may be easily maintained by the average workmen in industry. In the past rugged speed control devices have not been as accurate as desired, and highly perfected, intricate, and more exact devices have not been able to withstand the rugged applications to which they are subjected.

It is well recognized that controls for a D.C. hoist motor have, up to the present time, been less expensive and more safe than controls for A.C. hoist motors. At the same time D.C. motors were more costly to build and operate than A.C. hoist motors. Hoists driven by A.C. motors controlled with A.C. controls are the more economical to install and to operate, providing maximum safety is assured to the users of the hoists. These safety controls are particularly needed for safety purposes when polyphase alternating current motors of the induction type are used since the control must prevent overspeeding of the motor, particularly in the case of overhauling loads. If the hoist motor is permitted to overspeed, the danger of dropping a load, or not being able to stop a load at the end of its travel is increased to the point where it is possible to damage the hoist or other structures. At the same time it is desired to operate the motor at speeds up to its maximum safe speed and without disconnecting the motor until its speed has reached that certain predetermined safe maximum speed.

Another application wherein the present control may be used is for motor driven grinding wheel or the like, wherein it is desired to shut down or stop the grinding wheel if the speed thereof reaches a certain minimum speed.

One of the objects of the present invention is to overcome the aforementioned problems and others.

A further object of the present invention is to provide rugged and durable structure which will operate with a high degree of accuracy to disconnect a motor from its source of power when the speed of the motor reaches a certain speed.

A still further object of the invention is to provide speed responsive structure which will disconnect a mine hoist motor from its source of power if overspeeding of the motor starts to take place.

Another object of the invention is to provide a control mechanism comprising a differential having first and second members adapted to be driven at the same speed and at different speeds, respectively, and a differential element drivingly coupling the members and movable relative to the members and by the members in accordance with differential in speeds of the members, a variable speed motor drivingly connected to one of the members, a second motor operable at constant speed and drivingly connected to the other of the members, control means operative to selectively energize and de-energize at least one of the motors, and means drivingly connecting the differential element and the control means to effect operation of the control means in response to the differential in speeds of the members.

Figure 2:
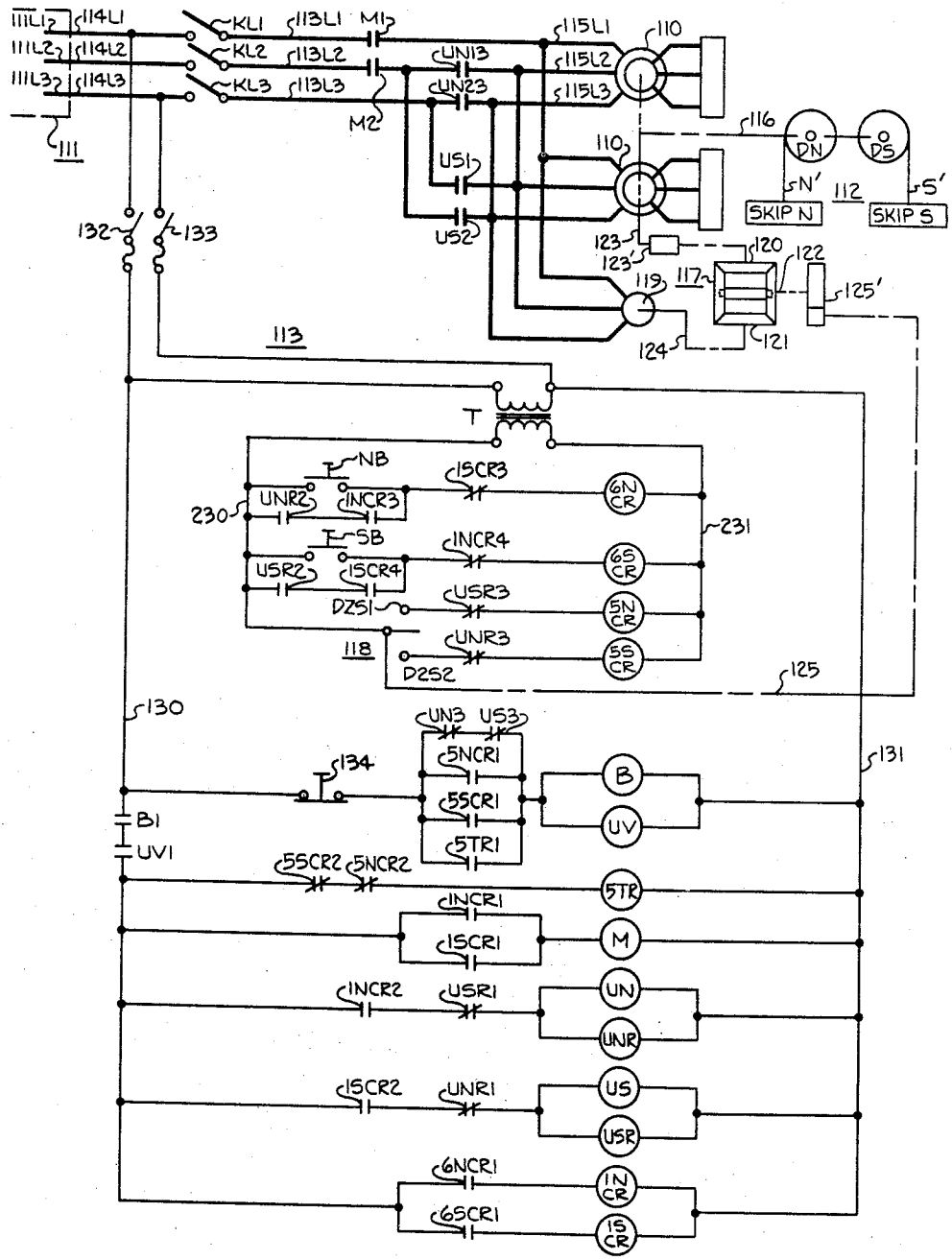

Further objects and a better understanding of the invention wil become apparent from the following description and the attached claim taken in conjunction with the accompanying drawings, in which:

Fig. 1 illustrates the features of the invention in block diagram type drawings, and Fig. 2 illustrates a control incorporating an embodiment of the invention for use in a mine hoist.

An embodiment of the invention is illustrated in Fig. 1 for the purpose of exemplification and not of limitation. In this embodiment a variable speed motor 10 is energized by a power source 11 for driving a load 12. The motor 10 is connected and disconnected from the power source 11 and is controlled by a motor control 13 which is interposed between the motor 10 and the power source 11. The motor control 13 is connected to the power source by a suitable wiring, represented by the solid line 14, and is connected to the motor 10 by suitable wiring, represented by the solid line 15. The motor 10 is connected to the load 12 through suitable mechanical linkage or mechanical driving connections, represented by the dash-dot line 16 in the drawing.

As further illustrated in Fig. 1 and to carry out the invention there is provided a differential 17, a direction switch 18 and a motor 19 which is operable at a constant speed. The motor 19 may be a constant speed motor, or a variable speed motor controlled to operate continuously at a constant speed. The differential used herein has input members 20 and 21 and a differential element 22 drivingly coupling members 20 and 21. Element 22 is movable relative to input members 20 and 21, and, in the present example, is revolvable about the axis of the members 20 and 21. In such a differential the speed of rotation and the direction of rotation of the element 22 is dependent on the relative speeds of and directions of rotation of the members 20 and 21.

In this instance the member 20 is connected by suitable mechanical connection, represented by the dash-dot line 23, to the mechanical connection 16 of the variable speed motor 10. Similarly, the member 21 is mechanically connected, as represented by the dash-dot line 24, to the motor 19. It is understood that the mechanical driving connections represented by the dash-dot lines 23 and 24 may be a direct drive wherein the members 20 and 21 rotate at the same speed as the speeds of the respective motors 10 and 19 or that the driving connections may include speed changing devices so that the input members 20 and 21 rotate at a predetermined ratio to the speeds of their respective motors.

Best results have been obtained by rotating members 20 and 21 in opposite directions relative to each other and when the differential operates in a manner wherein element 22 revolves about the axis of members 20 and 21 in one direction when member 20 is rotating slower than member 21, element 22 stands still when the members 20 and 21 are rotating at the same speed, and element 22 revolves in the opposite direction when the member 20 rotates faster than the member 21. This feature is used to carry out the present invention by mechanically connecting the direction switch 18 to the element 22 by a suitable mechanical connection, represented by the dash-dot line 25, and connecting the direction switch through suitable electrical connections, represented by solid line 26, in or to the motor control 13.

The direction switch 18 is of standard construction such that movement of element 22 in one direction holds the switch 18 in one position and movement of the element 22 in the opposite direction moves the switch to its opposite position. In one of these positions the switch 18 permits energization of the motor 10 and in the other of these positions the same switch causes deenergization of the motor 10, or causes disconnection of the motor 10 from its source of power 11. The apparatus for carrying out the present invention is completed by electrically connecting the constant speed motor through suitable wiring, represented by the solid line 27, to the power source 11 through motor control 13.

The direction switch 18 and the motor control 13 may be interconnected so that the variable speed motor 10 will be disconnected from power source 11 upon the speed of the motor 10 reaching a certain maximum speed at the high speed end of a desired speed range. Conversely, the direction switch 19 and the motor control 13 may be interconnected so that the variable speed motor 10 will be disconnected from the power source 11 upon the speed of the motor 10 reaching a certain minimum speed at the low speed end of a desired speed range.

To operate the apparatus illustrated in Fig. 1 for the purpose of carrying out the invention, the motor control 13 is activated to energize variable speed motor 10 and the motor 19 from the power source 11. As long as these two motors 10 and 19 are rotating at relative speeds, such that the variable speed motor is operating within a desired speed range, the differential 17 will hold the direction switch 18 in a position permitting motor control 13 to continue the energization of motors 10 and 19. If the speed of the variable speed motor reaches the certain speed at one end of the desired speed range, the differential 17 will operate switch 18 or move it to a position wherein it causes motor control 13 to disconnect at least one of the motors, and preferably at least the variable speed motor 10 from the source of power 11. The certain speed of the variable speed motor at which the direction switch 18 is operated is very accurately established since the element 22 stops to change its direction of rotation at that speed. Since the direction of rotation of the element 22 is very accurately dependent on the relative speeds of the members 20 and 21, the operation of or movement of switch 18 from its position permitting energization of variable speed motor 10 to its position causing deenergization of the variable speed motor is accurately and positively effected.

Fig. 2 illustrates the embodiment of the invention of Fig. 1 as applied to a mine hoist wherein it is desired to disconnect a variable speed hoist motor upon its speed reaching a maximum safe speed at the upper end of a desired speed range. In this particular application loads, such as a skip N and a skip S are to be alternately raised and lowered from a mine, skip N being raised while skip S is being lowered and vice versa. Each skip is suspended by its respective cable N' and S' from its respective drum DN and DS. The weight of each skip is dependent on the amount of material carried thereby, thus the weights of the loads are not always the same.

In this embodiment one or more variable speed three phase wound rotor motors 110 are energized by a power source 111 including wires $111L_1$, $111L_2$ and $111L_3$ for driving a load 112, including the drums DN and DS. Each motor 110 is connected and disconnected from the power source 111 and is controlled by a motor control 113, interposed between the motor 110 and the power source 111. The motor control 113 is connected to the power source by suitable wires including wires $114L_1$, $114L_2$ and $114L_3$, and is connected to the motor 110 by suitable wires including wires $115L_1$, and $115L_2$ and $115L_3$. Each motor 110 is connected to the drums DN and DS through suitable mechanical linkage or mechanical driving connections, represented by the dash-dot line 116 in the drawing. The system also includes a differential 117, a directional switch 118 and a constant speed motor 119. The three-phase wires $114L_1$, $114L_2$ and $114L_3$ are connected by knife switches $KL_1$, $KL_2$ and $KL_3$, respectively, to wires $113L_1$, $113L_2$, $113L_3$ in the motor control 113.

For the purpose of easily following the control circuit of motor control 113, the individual relays and contactors used therein are schematically illustrated and are described with reference to their operating coils and respective contacts. Each of the relay contacts operated by and associated with a particular relay coil carries that coil's reference character suffixed by a number. Further, in the present description, all control circuits and parts of the control 113 not specifically relating to the operation of the present invention have been eliminated so that the description clearly sets forth the structure and operation of the present invention.

Energization and de-energization of the variable speed motor 110, as well as the constant speed motor 119, is directly controlled by normally open main contacts $M_1$ and $M_2$ and normally open reversing contacts $UN_1$, $UN_2$ and $US_1$ and $US_2$. The main contacts $M_1$ and $M_2$ are in the lines $113L_1$ and $113L_2$, respectively. Interposed in the lines $113L_2$ and $113L_3$ are the contacts $UN_1$ and $UN_2$, respectively. The reversing contacts $US_1$ and $US_2$ are connected between $113L_3$ and $113L_2$ and between $113L_2$ and $113L_3$, respectively, and around the contacts $UN_1$ and $UN_2$ so that the phase relationship in wires $115L_1$, and $115L_2$ and $115L_3$ is reversed by opening contacts $UN_1$ and $UN_2$ and closing contacts $US_1$, $US_2$. All of these contacts are normally open contacts of suitable contactors and are closable by energizing their respective operating coil M, UN, and US. It is understood that static switching means may be used in place of the therein described contactors if desired to effect energization and de-energization of the motors.

The coils M, UN, and US are energized by a circuit including line 130, connected to phase wire 114L$_1$, and a line 131, connected to phase wire 114L$_3$. These lines 130 and 131 are provided, respectively, with suitable knife switch and fuse devices 132 and 133. Connected in series with the line 130 are normally open relay contacts B$_1$ and normally open relay contacts UV$_1$, each adapted to be closed upon energization of its respective relay coil B and UV. As is illustrated in the drawings, there is connected in series connection between lines 130 and 131 a normally closed emergency stop button 134, relay contacts 5TR$_1$ and relay coil UV. Connected in parallel with the relay contacts 5TR$_1$ are relay contacts 5SCR$_1$, relay contacts 5NCR$_1$, and series contacts UN$_3$ and US$_3$. Connected in parallel with the relay coil UV is the relay coil B. Relay contacts 5SCR$_2$, 5NCR$_2$, and a relay coil 5TR, are connected in series circuit between lines 130 and 131 and on the load side of contacts B$_1$ and UV$_1$ so that relay 5TR can be energized only when contacts B$_1$ and UV$_1$ are closed.

Also connected between the lines 130 and 131 and in series circuit are normally open relay contacts 1SCR$_1$ and the contactor coil M. Shunting the contacts 1SCR$_1$ are normally open relay contacts 1NCR$_1$. Also interconnected between the lines 130 and 131 are normally open relay contacts UNCR$_2$, normally closed relay contacts USR$_1$, and the contactor coil UN, all of which are connected in series. Shunting the coil UN is a relay coil UNR.

Also connected between the lines 130 and 131 are normally open relay contacts 1SCR$_2$, normally closed relay contacts UNR$_1$ and the contactor coil US, all of which are connected in series. Shunting the contactor coil US is a relay coil USR. Also connected between the lines 130 and 131 are normally open relay contacts 6NCR$_1$ and a relay coil 1NCR connected in series therewith. Similarly, normally open relay contacts 6SCR$_1$ are connected in series with a relay coil 1SCR and the series is then connected between the lines 130 and 131.

In this instance the power supply for the mine hoist is relatively high voltage, such, for example, 440 volts, and it is desired to have part of the control circuit operative on a much lower voltage, such, for example, 110 volts. To obtain voltage reduction there are provided leads 230 and 231 electrically connected and energized through a transformer T to and by the control lines 130 and 131. It is understood that if desired the entire control circuit could be operative at a single voltage in which case the leads 230 and 231 would become integral with their respective leads 130 and 131.

Continuing the description of the control circuit there is connected in series between the leads 230 and 231 normally open start button contacts NB, normally closed relay contacts 1SCR$_3$ and a relay coil 6NCR. Shunting the start button contacts NB are normally open contacts UNR$_2$ and 1NCR$_3$, which are connected in series. The circuit further includes normally open start button contacts SB, normally closed relay contacts 1NCR$_4$ and a relay coil 6SCR electrically connected in series between the lines 230 and 231. Shunting the pushbutton contacts SB are normally open contacts USR$_2$ and 1SCR$_4$ which are connected in series.

Directional switch

As illustrated in the drawings, the directional switch 118 effectively has two contacts DZS$_1$ and DZS$_2$, both of which are normally open with the contacts selectively closable dependent on the direction of rotation of the switch. These contacts are included in the control circuit 113. As illustrated the set of contacts DZS$_1$ is connected in series with a normally closed set of contacts USR$_3$ and a relay coil 5NCR, the series being connected between the leads 230 and 231. Similarly, the sets of contacts DZS$_2$ is connected in series with normally closed contacts UNR$_3$ and a relay coil 5SCR across the leads 230 and 231.

Differential

The differential used herein is of the well known automotive type which has input shafts 120 and 121 and an output shaft 122. In such a differential the speed of rotation and direction of rotation of the output shaft 122 is dependent on the relative speeds of rotation of the input shafts 120 and 121. In this instance, the input shaft 120 is connected by suitable mechanical connection represented by the dash-dot line 123 to the mechanical connection 116 of the variable speed motor 110. Similarly, the input shaft 121 is mechanically connected, as represented by the dash-dot line 124, to the constant speed motor 119. It is understood that the mechanical driving connection represented by the dash-dot lines 123 and 124 may be a direct drive wherein the input shafts 120 and 121 rotate at the same speed as the speeds of the respective motors 110 and 119 or that the driving connections may include speed changing devices such, for example, speed changing device 123', in connection 123, so that the input shafts 120 and 121 rotate at a predetermined ratio to the speeds of their respective motors.

Best results have been obtained when the gear type differential operates in a manner wherein the output shaft 122 rotates in one direction when the input shaft 120 is rotating slower than the input shaft 121, output shaft 122 stands still when the input shafts 120 and 121 are rotating at the same speed, and output shaft 122 rotates in the opposite direction when input shaft 120 rotates faster than the input shaft 121. This feature is used to carry out the present invention by mechanically connecting direction switch 118 to the output shaft 122 by a suitable mechanical connection, represented by the dash-dot line 125 and connecting the direction switch as herein described in the motor control 113. The mechanical connection 125 may include a speed changer 125', if desired, to magnify the movement of the output shaft 122. The direction switch 118 is of standard construction such that operation of shaft 122 holds the switch 118 in one position and non-rotation of, or rotation of the shaft 122 in the opposite direction moves the switch to another position or to its opposite position.

The apparatus for carrying out the present invention is completed by electrically connecting the constant speed motor to wires 115L$_1$, 115L$_2$ and 115L$_3$.

Operation

The system illustrated in Fig. 2 operates as follows: Assume as a starting point the skip N is lower in a mine shaft than the skip S and is to be raised, with the skip S being lowered simultaneously therewith. The first step in operation is to close the knife switches 132 and 133 to energize the control circuit and to close the main knife switches KL$_1$, KL$_2$ and KL$_3$. Closing knife switches 132 and 133 energizes lines 130 and 131 to pass current through emergency stop button 134, contacts UN$_3$, US$_3$, coil B and coil UV. Contacts B$_1$ and UV$_1$ in line 130 are closed upon energization of the coils B and UV, thereby causing energization of coil 5TR, which, in turn, closes the set of contacts 5TR$_1$. The entire control 113 is now ready for operation.

Next, the start button NB is pushed to closed position, thereby allowing current to flow between lines 230 and 231 and through the button contacts NB, contacts 1SCR$_3$ and coil 6NCR. Energization of coil 6NCR closes contacts 6NCR$_1$ resulting in energization of coil 1NCR by the lines 130 and 131. Energization of the coil 1NCR closes the sets of contacts 1NCR$_1$, 1NCR$_2$, 1NCR$_3$, and opens the set of contacts 1NCR$_4$ to prevent the motor control responding to an accidental closing of the start button contacts SB. Closure of the sets of contacts 1NCR$_1$, and 1NCR$_2$ energizes the coils M and UN to close the main contactors M$_1$, M$_2$ and the contactors UN$_1$, UN$_2$ to energize the variable speed motors 110 and the constant speed motor 119 in the correct direction for hoisting the skip N. The constant speed motor 119 will accelerate faster than the variable speed motors 110 because it is smaller and does not have to accelerate under as large a load. Thus immediately from the initial energization of the motors 110 and 119, the motor 110 is rotating the differential input 121 at a speed faster than motor 110 is rotating the differential input 120, thereby causing the differential to move the switch 118 to the position which permits continued energization of the variable speed motors 110. It is noted that the coil UNR is also energized upon closing of contacts $1NCR_2$ to open contacts $UNR_1$ and $UNR_3$ and close the contacts $UNR_2$. Closure of contacts $UNR_2$ along with the prior closure of the contacts $1NCR_3$ interlocks and thus shunts the start button contacts NB.

As long as the motors 110 and 119 are rotating with the motor 110 operating in its normal speed range and below its maximum safe speed, the directional switch 118 is positioned with its contacts $DZS_1$ closed, thereby energizing the relay coil 5NCR. This results in the closure of contacts $5NCR_1$ which shunt the contacts $5TR_1$, and in the opening of contacts $5NCR_2$ which de-energize coil 5TR. After a period of time the contacts $5TR_1$ open since they, along with the coil 5TR are a part of a time-out relay. Following the opening of the contacts $5TR_1$, the coils B and UV are continued to be energized so long as the emergency pushbutton 134 is closed and so long as the contacts $5NCR_1$ remain closed.

If, for any reason, the speed of the motors 110 increases or starts to leave the predetermined speed range, or if the motors 110 reach their maximum safe speed, due to the effect of the weight of the skips attempting to overhaul the motors, the differential 117 will cause the switch 118 to open the contacts $DZS_1$. Opening the contacts $DZS_1$ de-energizes coil 5NCR, thus opening the contacts $5NCR_1$ and de-energizing the coils B and UV. Contacts $B_1$ and $UV_1$ open upon de-energization of the coils B and UV to effectively kill the circuit by de-energizing coils M, UN, UNR, 1NCR and 5TR thereby disconnecting the motors 110 and 119 from the source of power by opening the respective contacts $M_1$, $M_2$, $UN_1$ and $UN_2$. Since 1NCR has been de-energized, contacts $1NCR_3$ open to de-energize the coil 6NCR and the entire motor control is returned to its starting position.

It is noted that unless the knife switches 132 and 133 are now opened, and since contacts $UN_3$ and $US_3$ are automatically reclosed, the coils B and UV again become energized to close their contacts $B_1$, and $UV_1$, to ready the circuit for another operation. It is further noted that continued operation of the motors may be stopped at any time by pressing one of the stop buttons 134 to de-energize the coils B and UV. This causes disconnection of the motors 110 and 119 in the same manner as described when coils B and UV are de-energized by the switch 118.

The motor 110 and the motor 119 may be operated in the opposite direction or reverse direction to raise the skip S and simultaneously lower the skip N by depressing the start pushbutton SB to effect the closure of the contacts $M_1$, $M_2$ and the contacts $US_1$, and $US_2$ for energizing the motors. The operation of the motor control circuit is very similar to that previously described but, in this instance, so long as the motor 110 is operating within its correct speed range the contacts $DZS_2$ are closed thus energizing the coil 5SCR. If the motors 110 start to overspeed the switch contacts $DZS_2$ are opened and the motors are completely disconnected from the power lines. Complete operation of the circuit when the start button SB is depressed and closed is not being described in detail since the relays therefor operate in the same manner as those described in connection with depressing start button NB.

The herein described control thus permits operation of the hoist so long as the motors are operated within their safe speed range and continues energization of the motors until they have exactly or substantially exactly reached their maximum safe speed. However, if the motors start to operate beyond the maximum safe speed, they will immediately be disconnected.

I claim:

A hoist and control therefor comprising a hoist motor responsive in speed to the weight of a load being moved thereby in such manner that the hoist motor will operate in a safe speed range to move a load of one weight and will be overhauled to rotate at an unsafe speed upon attempted movement of a load of another weight, a constant speed second motor permanently connected electrically in parallel with said hoist motor, a control device for controlling the electrical connection and disconnection of said parallel connected hoist and second motors to a source of power, said device including a differential having input shafts adapted to be rotated at the same speed and at different speeds, respectively, an output shaft rotatable in accordance with the differential in speeds of rotation of the input shafts, means for drivingly connecting one of said input shafts to said hoist motor for rotation in accordance with the speed of the hoist motor, said second motor being operable at constant speed and being drivingly connected to the other of said input shafts to rotate said other of said input shafts continuously at a constant speed, contactor means operative to selectively connect and disconnect said parallel connected hoist and second motors to and from said source of power, switch means operated by said output shaft and connected with said contactor means to effect operation of said contactor means in response to the differential in speeds of the input shafts to effect disconnection of said parallel connected hoist and second motors when said hoist motor starts to rotate at an unsafe speed upon attempted movement of a load of said another weight.

References Cited in the file of this patent

UNITED STATES PATENTS

| 1,048,999 | Pratt | Dec. 31, 1912 |
| 1,672,670 | Wilfart | June 5, 1928 |
| 1,706,443 | Dekle | Mar. 26, 1929 |
| 2,171,996 | Schultz | Sept. 5, 1939 |